(12) United States Patent
Holland et al.

(10) Patent No.: US 10,807,492 B1
(45) Date of Patent: Oct. 20, 2020

(54) SWITCHABLE MAGNETIC BATTERY DOCKING

(71) Applicant: X Development LLC, Mountain View, CA (US)

(72) Inventors: Eric Holland, Mountain View, CA (US); Michael George Sleator, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 1209 days.

(21) Appl. No.: 15/130,880

(22) Filed: Apr. 15, 2016

(51) Int. Cl.
| | | |
|---|---|---|
| *B60K 1/04* | (2019.01) | |
| *B60L 53/80* | (2019.01) | |
| *B60L 53/14* | (2019.01) | |
| *B60L 53/35* | (2019.01) | |
| *B60L 53/60* | (2019.01) | |
| *B60L 58/21* | (2019.01) | |
| *B60S 5/06* | (2019.01) | |
| *H01F 7/04* | (2006.01) | |

(52) U.S. Cl.
CPC ............... *B60L 53/80* (2019.02); *B60K 1/04* (2013.01); *B60L 53/14* (2019.02); *B60L 53/35* (2019.02); *B60L 53/60* (2019.02); *B60L 58/21* (2019.02); *B60S 5/06* (2013.01); *B60K 2001/0438* (2013.01); *B60K 2001/0472* (2013.01); *H01F 7/04* (2013.01)

(58) Field of Classification Search
CPC .......... B60L 53/80; B60L 53/60; B60L 53/35; B60K 1/04; B60K 2001/0438; B60K 2001/0472; B60K 2001/0455; B60S 5/06; B25J 15/0616; H01F 8/0252; H01F 8/0257; H01F 8/0268; H01F 8/04; H02N 15/00; F16B 2001/0035
See application file for complete search history.

(56) References Cited

U.S. PATENT DOCUMENTS

| | | | | | |
|---|---|---|---|---|---|
| 2,243,616 | A | * | 5/1941 | Bing | ............... H01F 7/0257 335/295 |
| 8,560,147 | B2 | * | 10/2013 | Taylor | ............... B60L 1/003 701/2 |

(Continued)

OTHER PUBLICATIONS

Hilton, James et al., An adustable linear Halbach array, Feb. 18, 2012, Journal of Magnetism and Magnetic Materials, 324 (2012) 2051-2056 (Year: 2012).*

*Primary Examiner* — Steve Clemmons
(74) *Attorney, Agent, or Firm* — McDonnell Boehnen Hulbert & Berghoff LLP

(57) ABSTRACT

One or more switchable magnetic systems is located near a battery attachment surface of an electric vehicle, where the battery attachment surface is configured to accept and electronically connect to a battery pack. The electric vehicle also includes a control system that operates the one or more switchable magnetic system switching from a first to a second state. In the first state the magnetic field of the switchable magnetic system secures the battery pack to the battery attachment surface so that the battery pack is electronically coupled to an electric motor of the electric vehicle. When the control system receives a message corresponding to removal of the battery pack, the control system switches the switchable magnetic system to the second state such that the battery pack is removable from the battery attachment surface.

16 Claims, 10 Drawing Sheets

(56) References Cited

U.S. PATENT DOCUMENTS

| | | | | |
|---|---|---|---|---|
| 8,757,689 B2* | 6/2014 | Ding | ............... | H01F 7/0257 |
| | | | | 294/65.5 |
| 8,892,258 B2* | 11/2014 | Jacobsen | ............... | B25J 5/007 |
| | | | | 483/27 |
| 9,822,611 B2* | 11/2017 | Delzell | ............... | E21B 33/12 |
| 9,868,421 B2* | 1/2018 | Hassounah | ............... | B60S 5/06 |
| 9,873,409 B2* | 1/2018 | Corfitsen | ............... | B60K 1/04 |
| 10,308,125 B2* | 6/2019 | Ahrens | ............... | B60L 53/80 |
| 2009/0198372 A1* | 8/2009 | Hammerslag | ............... | B60L 53/665 |
| | | | | 700/226 |
| 2015/0047947 A1* | 2/2015 | Tait | ............... | B60S 5/06 |
| | | | | 198/339.1 |
| 2018/0154789 A1* | 6/2018 | Janku | ............... | B60S 5/06 |
| 2019/0210482 A1* | 7/2019 | Lin | ............... | B25J 9/00 |

\* cited by examiner

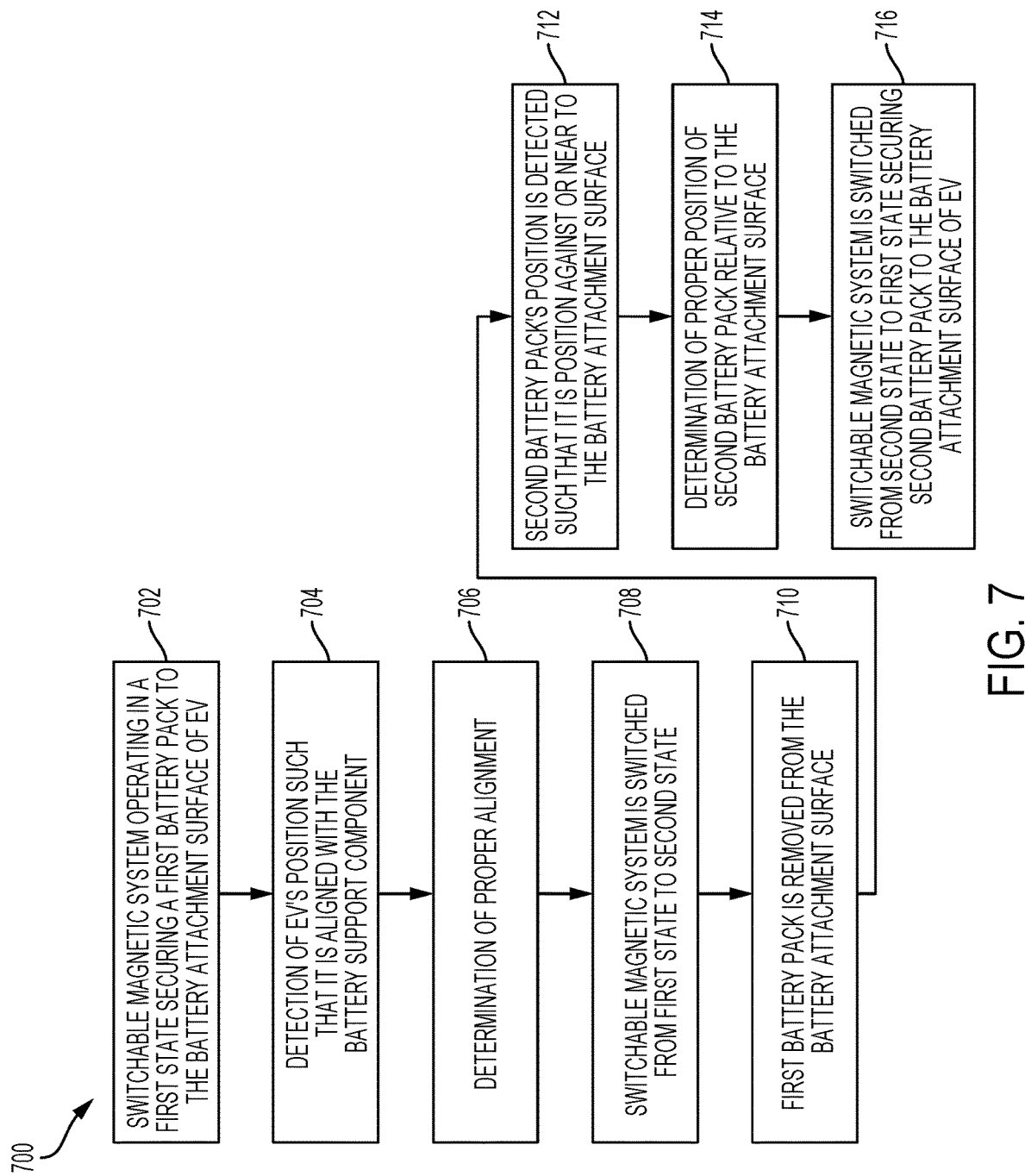

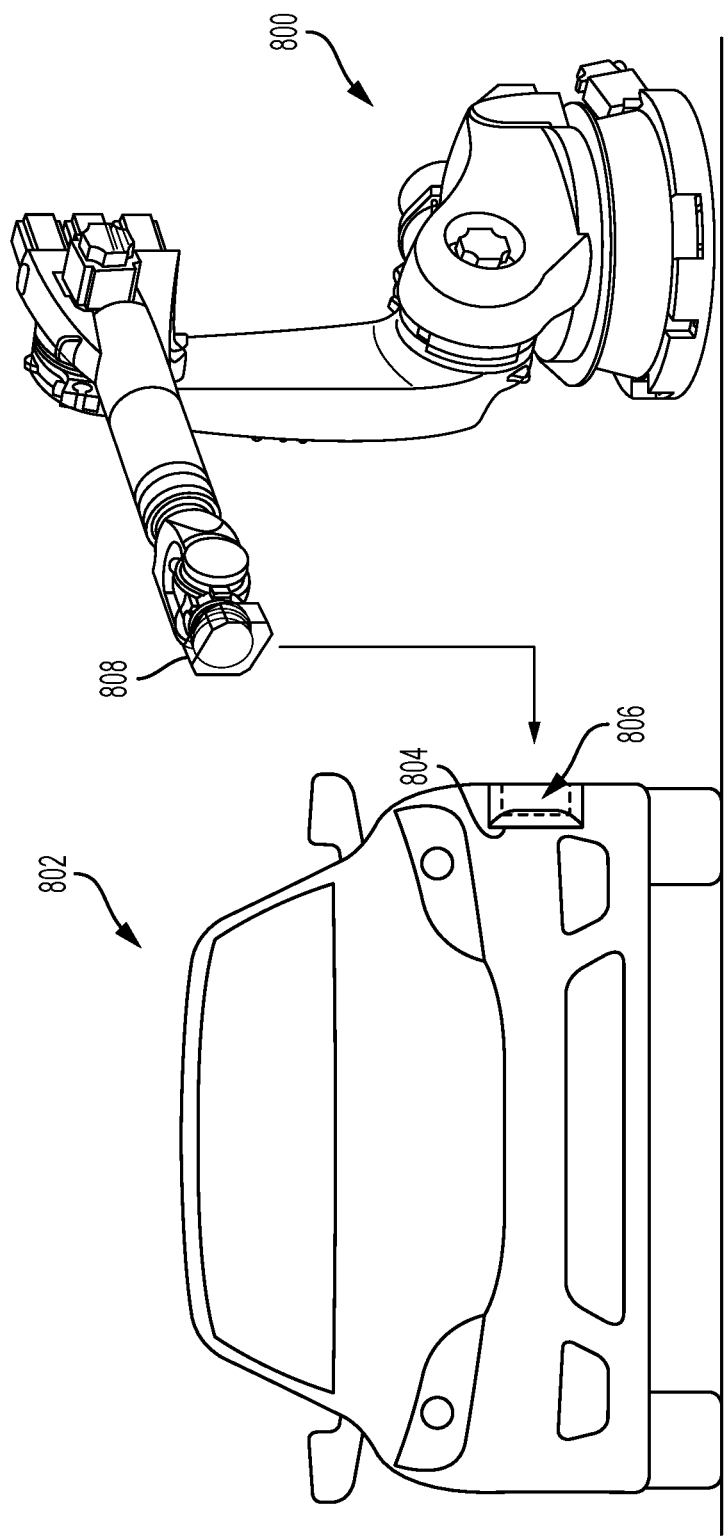

SWITCHABLE MAGNETIC BATTERY DOCKING

BACKGROUND

Typically, when a battery pack is used to power motorized devices, such as an electric vehicle ("EV") or an unmanned aerial vehicle ("UAV"), the battery pack is charged through an electric plug or by swapping the drained pack with a fully charged one at a swapping station. In the case of the latter, the battery pack is usually secured to the vehicle by mechanical means, such as a clamp or multiple screws. This may require the installation of complicated mechanical elements to both the vehicle and battery pack in addition to installation of complex robot systems in the swapping station if the process is to be automated. Otherwise, the process will need to be done by human technicians, which may make such battery swapping techniques expensive and inefficient.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

SUMMARY

The following disclosure is directed toward an electric vehicle system that securely attaches battery packs for an electric vehicle using a switchable magnetic system, such as a switchable Halbach array. According to some embodiments, an electric vehicle system includes one or more switchable Halbach arrays located on or near a battery attachment surface. The one or more switchable Halbach arrays are operable to magnetically securely hold the battery pack for the electric vehicle's electric engine in place. The magnets forming a switchable Halbach array may be re-oriented so as to switch between a first and second mode in which the strong and weak sides of the Halbach array's magnetic field are reversed. A switchable Halbach array may therefore "turn on" or "turn off" the magnetic field on a battery-facing side of the battery attachment surface by aligning the strong side or weak side of its magnetic field with the battery-facing side, respectively. As such, a switchable Halbach array may be "turned on" to secure the battery pack to the electric vehicle, and "turned off" to make the battery pack easier to remove or perhaps release the battery pack altogether.

More generally, in one aspect, an example system includes: (a) one or more switchable magnetic systems located at or near a battery attachment surface of an electric vehicle, wherein the battery attachment surface is arranged to accept and electrically connect a battery pack; and (b) a control system operable to: (i) operate the one or more switchable magnetic systems in a first state in which a magnetic field of the one or more switchable magnetic systems secures the battery pack to the battery attachment surface, such that the battery pack is electrically coupled to an electric motor of the electric vehicle; (ii) receive a message corresponding to removal of the battery pack from the electric vehicle; and (iii) responsively switch the one or more switchable magnetic systems to operate in a second state in which the battery pack is removable from the battery attachment surface.

In another aspect, an example battery changing system includes: a battery support component that is positionable against a first battery pack that is magnetically secured to a battery attachment surface of an electric vehicle by one or more switchable magnetic systems of the electric vehicle; and a control system. The control system is operable to: (i) at a time when the one or more switchable magnetic systems are operating in a first state in which a magnetic field of the one or more switchable magnetic systems secures the first battery pack to the battery attachment surface, position the battery support component to support the first battery pack that is secured to the battery attachment surface of the electric vehicle; (ii) while the battery support component is positioned to support the first battery pack, receive a message corresponding to removal of the first battery pack; and (iii) in response to the message, operate the battery support component to: (a) remove the first battery pack from the electric vehicle, (b) receive a second battery pack, and (c) position the second battery pack against or near to the battery attachment surface of the electric vehicle so as to facilitate the one or more switchable magnetic systems switching back to operation in the first mode to magnetically secure the second battery pack to the battery attachment surface of the electric vehicle.

In a further aspect, an example method involves: (a) initially operating one or more switchable magnetic systems of the electric vehicle in a first state in which a magnetic field of the one or more switchable magnetic systems magnetically secures a first battery pack to a battery attachment surface of the electric vehicle; (b) detecting that the electric vehicle is in an acceptable alignment with a battery support component of a battery changing system; (c) in response to determining that an electric vehicle is in an acceptable alignment with a battery support component of a battery changing system, switching the one or more switchable magnetic systems to operate in a second state in which the first battery pack is removable from the battery attachment surface; (d) detecting that a second battery pack is positioned against or near to the battery attachment surface; and (e) in response to detecting that a second battery pack is positioned against or near to the battery attachment surface, switching back to operating the one or more switchable magnetic systems in the first mode in which the magnetic field of the one or more switchable magnetic systems secures the second battery pack to the battery attachment surface.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 7 is a flowchart illustrating a method according to an example embodiment.

FIG. 8 is an illustration of another battery-changing system according to an example embodiment, which includes a robotic arm.

DETAILED DESCRIPTION

Figure 1:
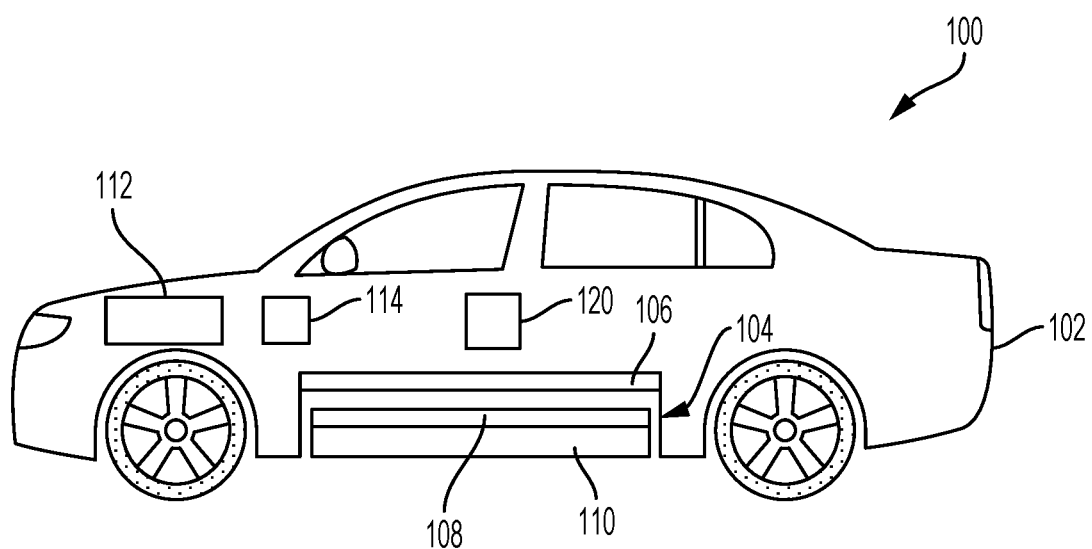
FIG. 1 is an illustration of a vehicle having a battery configuration compatible with an example battery-changing system.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the embodiments described herein are not meant to be limiting. It will be readily understood that certain aspects of the disclosed systems and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise. It will be readily understood that certain aspects of the disclosure can be arranged and combined in a wide variety of different configurations, all of which are contemplated herein.

I. Overview

Electric motorized devices such as electric vehicles ("EV") and unmanned aerial vehicles ("UAV") have become more prevalent, which has increased the need for improvements to the batteries that power such vehicles. In particular, there is need for batteries that are more compact, and at the same time have greater power density. For example, improvements to such battery packs are desirable to improve the performance of electric engines so that EVs perform at a level and that is competitive with comparable vehicles powered by internal combustion engines, while also providing a range on a single charge that is competitive with, e.g., the range of a comparable vehicles with internal combustion engines can travel on a single tank of gas.

The batteries that power an EV's electric engine must be recharged or replaced when drained or low. Thus, to maintain adequate power, EV owners typically: (a) connect the EV's battery to charging system that draws power from the electric grid to recharge the battery, or (b) swap the EV's used battery for a fully charged battery at a swapping station. There are distinct advantages and disadvantages to both methods. For instance, completely charging a used battery currently takes much more time than, e.g., filling a conventional car's gas tank at a gas station. And, while, swapping batteries is quicker, removing a used battery and/or replacing it with a charged battery can require the use of complex and expensive systems in one or both of the EV and the swapping station. Further, with respect to electric cars, there are currently far fewer swapping stations than gas stations, creating many long-distance routes in the United States that are much less convenient for electric cars, or perhaps only accessible to gas-powered cars. As a result of the limitations on electric vehicle charging, there is a perception by some that electric vehicles are inferior to gas-powered vehicles for long-distance travel (e.g., on routes that are longer than the range of the electric vehicle on a single charge).

Thus, there is a need to improve battery swapping systems and processes, so that electric vehicles can more easily be used for long-distance travel. Accordingly, example embodiments may help simplify the battery changing process by using switchable magnetic systems to secure and release an electric vehicle's battery pack. A battery may be a 85 kWh lithium ion battery used in Tesla's Model S®, a 24 kWh lithium ion battery used in Nissan's Leaf®, or a 17.1 kWh lithium ion battery used in Chevrolet's Volt®. In particular, an example embodiment may use a switchable magnet, such as a switchable Halbach array or a switchable electromagnetic, for this purpose.

For example, as noted above, a switchable Halbach array may be located on or near a battery attachment surface on the electric vehicle. The Halbach array may be placed in a first mode where the strong side of the Halbach array's magnetic field will magnetically secure the battery pack for the electric vehicle's electric engine against the battery attachment surface. The magnetic field provided in the first mode may be strong enough that, e.g., a typical human will not be able to remove the battery pack from the battery attachment surface. As such, risk of the battery pack dislodging while the electric vehicle is operating is reduced, and hopefully eliminated.

Further, in a second mode, the Halbach array's magnetic field may be reversed such that the battery pack is more loosely secured to the battery attachment surface of the electric vehicle (e.g., so that a typical human will be able to remove the battery pack by hand and/or such that it the battery pack is more easily removed by an automated battery swapping system) Alternatively, the magnitude of the magnetic field on the weak side of the Halbach array may be low enough that switching to the second mode will release the battery pack from to the battery attachment surface altogether.

In a further aspect, the use of a switchable Halbach array to secure an EV's battery may provide an advantage over the use of an electromagnet for the same purpose, as a Halbach array does not require power in order to magnetically secure a battery. The fact that a Halbach array can secure a battery pack even when power is lost may provide a safety enhancement by reducing the risk of the battery pack being unintentionally released or dislodged due to an electrical failure. It should be understood, however, that this potential benefit does not foreclose the use of electromagnetic systems in example embodiments.

II. Illustrative Battery Changing Stations

Example system may include components of electric vehicle only, components of a swapping station only, or components of both.

An example swapping system for an electric vehicle may include one or more switchable magnetic systems located at or near a battery attachment surface of an electric vehicle. Herein, a "battery attachment surface" may be any surface that is arranged on or within an electric vehicle to which the vehicle's battery pack can be secured in a position in which the battery is electrically coupled to the vehicle's electric engine. For example, the one or more switchable magnetic systems may be configured to secure the battery pack to a battery attachment surface in a recess that is shaped to fit the battery pack. Further, the recess may position the battery pack such that the battery pack's electrical contacts couple with corresponding electrical contacts on the EV, and can thus provide power to the EV's electric engine and/or other electrical systems of the EV.

Further, an example system for an EV may include a control system that coordinates and automates functions during the battery swapping process. For example, the EV may include a control system that is configured to: (a) operate the one or more switchable magnetic systems in a first state in which a magnetic field of the one or more switchable magnetic systems secures the battery pack to the battery attachment surface, (b) receive a message corresponding to removal of the battery pack from the electric vehicle, and (c) responsively switch the one or more switchable magnetic systems to operate in a second state in which the battery pack is removable from the battery attachment surface.

As another example, an EV may include a control system with program instructions that are executable by a processor to: (i) initially operate one or more switchable magnetic systems of the electric vehicle in a first state in which a magnetic field of the one or more switchable magnetic systems magnetically secures a first battery pack to a battery attachment surface of the electric vehicle, (ii) detect that the electric vehicle is in an acceptable alignment with a battery support component of a battery changing system, (iii) in response to determining that an electric vehicle is in an acceptable alignment with a battery support component of a battery changing system, switch the one or more switchable magnetic systems to operate in a second state in which the first battery pack is removable from the battery attachment surface, (iv) detect that a second battery pack is positioned against or near to the battery attachment surface, and (v) in response to detecting that a second battery pack is positioned against or near to the battery attachment surface, switch back to operating the one or more switchable magnetic systems in the first mode in which the magnetic field of the one or more switchable magnetic systems secures the second battery pack to the battery attachment surface.

An example battery swapping station may be designed to complement an example swapping system on an EV. For example, a battery changing system may include a moveable battery support component that can remove a used battery pack from the EV's battery attachment surface and/or move a charged battery pack into position to be magnetically attached to the EV's battery attachment surface. The moveable battery support component may take various forms, such as a battery support surface (e.g., a shelf) that can be raised and lowered piston mechanism, and can support a battery from underneath, such that gravity will hold a battery in place on the battery support surface. Such an arrangement may be used to receive a used battery from, and provide a charged battery to, a battery attachment surface that is located underneath the body of the car (e.g., on the outer surface of the vehicle that faces the ground). In other embodiments, moveable battery support component may take the form of a robotic arm with an end effector that can hold a battery, such that the robotic arm can remove a used battery from, and provide a charged battery to, an EV's battery attachment surface.

In a further aspect, an example battery swapping station may include a control system that coordinates and automates functions during the battery swapping process. The swapping station's control system may be operable to: (i) position the battery support component to support a first (used) battery pack that is secured to the battery attachment surface of the electric vehicle (e.g., at a time when the EV's switchable magnetic systems are securing the first battery pack to the battery attachment surface), (ii) receive a message corresponding to removal of the first battery pack, and (iii) in response to the message, operate the battery support component, and possibly one or more other components of the swapping system, to: (a) remove the first battery pack from the electric vehicle (e.g., while the EV's switchable magnetic systems are in the second mode that less securely holds or releases the battery pack), (b) receive a second (charged) battery pack, and (c) position the second battery pack against or near to the battery attachment surface of the electric vehicle, such that the EV can switch back to the first mode of its switchable magnets to secure the second battery to its battery attachment surface.

Example systems will now be described by way of example, with reference to the EV and swapping station systems shown in FIGS. 1-6 and 8. However, it should be understood that the specific implementations shown in FIGS. 1-6 and 8 are not intended to be limiting.

Referring to FIG. 1, a vehicle system 100 includes an electric vehicle ("EV") 102 with a recess 104. A first switchable magnet 106, such as a Halbach array, is located on the surface of the recess 104. A battery pack 110 slightly smaller in dimension compared to the dimension of the recess 104 is detachably secured to the recess 104. In one embodiment, the outer casing of the battery pack 110 is manufactured from ferromagnetic materials such that when the switchable magnet 106 is turned "on," the magnetic forces of the switchable magnet 106 secures the battery pack 110. In another embodiment, the battery pack 110 is equipped with a second switchable magnet 108 and the recess 104 is manufactured from ferromagnetic materials. The second switchable magnet 108 will be turned "on" as it is mated to the recess 104. In a further embodiment, both the recess 104 and the battery pack 110 are equipped with the first 106 and second switchable magnets 108, respectively. In such a configuration, the first 106 and second switchable magnets 108 will be manipulated in such a way that the two magnets 106, 108 will pull each other together, securing the battery pack 110 to the recess 104 of the EV 102.

In a further aspect, EV 100 includes a control system 120. The control system may take the form of and/or may include various types computing devices, communication interfaces, various interfaces to sensors, and/or interfaces to various user-input devices, among other possibilities. Generally, a control system will at least include a processor, executable program instructions stored on a non-transitory computer readable medium, and communication interfaces that allow for communications to be sent to and/or received from the various components of the EV 102, such that functions described herein may be carried out by the EV 102. For example, control system 120 may include program instructions that are executable by a processor to: (i) operate the one or more switchable magnetic systems in a first state in which a magnetic field of the one or more switchable magnetic systems secures the battery pack to the battery attachment surface, such that the battery pack is electrically coupled to an electric motor of the electric vehicle, (ii) receive a message corresponding to removal of the battery pack from the electric vehicle, and (iii) responsively switch the one or more switchable magnetic systems to operate in a second state in which the battery pack is removable from the battery attachment surface.

In some embodiments, the EV 102 includes a reserve power source 112, such as a typical 12V car battery and/or other sources of electricity. Such a reserve power source may allow the EV 102 can power its critical components or passenger comfort components (A/C, radio etc.) when the battery pack 110 is detached from the recess 104. The reserve power source may facilitate "hot swapping" of the battery pack 110; or in other words, swapping the battery pack without turning off some, or possibly any, of the EV's electrical systems.

In some embodiments, EV 102 may include a reserve internal combustion motor ("ICM") 114 that turns on during hot swapping. The ICM can be used only during hot swapping or can be used to provide additional power during cruising. In another embodiment, the ICM 114 can further be used to charge the battery pack 110 to extend the range of the EV 102.

In some embodiments, an EV 102 may be entirely electric, and thus may rely exclusively on electric power (e.g., from one or more batteries). Alternatively, an EV may be a hybrid that can utilize electric power sources and one or more other types of power sources (e.g., a gas-powered internal combustion engine). Further, it should be understood that example battery-changing systems may be implemented as part of or for EVs having various forms. For example, example embodiments may be implemented as part of or designed for use with, e.g., automobiles, motorcycles, boats, various types of watercraft, and/or various types of aircraft. Additionally, an EV 102 may be configured to be driven or piloted by a human, and/or may be configured for wholly or partially autonomous operation.

In some embodiments, the recess 104 may be eliminated from the structure of the EV 102. The switchable magnet 106 may be located on the outer surface of the bottom of the EV 102. In such an embodiment, the battery pack 110 may include additional structural reinforcements in its outer casing to protect the battery components from the elements.

Further, switchable magnets, such as switchable magnet 106, may take various forms according to the particular implementation. More generally, a switchable magnet 106 may be any magnet or magnets that are controllable to alternate between: (a) a first state where its magnetic field that magnetically holds battery pack 110 in place (against an EV's battery attachment surface), such that a that the battery pack can provide power to the EV 102, and (b) a second state where its magnetic field does not hold battery pack 110 in place or holds the battery pack much more loosely than in the first state, such that the battery pack can be more easily removed from the EV. Alternatively, in some embodiments, a switchable magnet may be a magnet that is controllable to alternate between: (a) a first state where its magnetic field that magnetically holds battery pack 110 in place, such that a that the battery pack can provide power to the EV 102, and (b) a second state where its magnetic field changes direction and repels battery pack 110 away from the EV's battery attachment surface.

In some embodiments, a switchable magnet 106 may take the form of a Halbach array, or possibly multiple Halbach arrays. A Halbach array is a formed by an arrangement of permanent magnets such that the individual magnetic fields augment one another on one side of the array, and cancel one another on the other side, resulting in a magnetic field that is much stronger on one side of the array than it is on the other. Theoretically, the magnetic field can be canceled entirely on the weak side of the Halbach array; however, in practice, a slight magnetic field will typically still exist on the weak side.

In an example embodiment, a Halbach array may be made switchable using a mechanically actuated system that can reconfigure the magnets that form the array, so as to reverse the strong and weak side. As such, a switchable Halbach array, such as a variable flat array, may provide an efficient and mechanically switchable magnetic latch, which can hold a battery in place and/or switch on and off, without the need to connect the latch to a power source. Note that a more detailed description of a switchable Halbach array that may be utilized is provided later in this disclosure.

As a specific example, an EV's control system 120 may be configured to selectively switch between a first and second mode of the Halbach array. In particular, first mode involves orienting the magnets of the Halbach array so that the strong side of the magnetic field is located on a battery-facing side of the battery attachment surface. Further, in the first mode, the orientations of the magnets may be such that the concentrated magnetic field is in a first direction such that the Halbach array's magnetic field attracts the battery pack. Thus, in the first mode, the Halbach array can magnetically secure the battery pack to the battery-facing surface of the EV. Switching to the second mode can involve re-orienting the magnets of the Halbach array such that the weak side of the magnetic field is located on a battery-facing side of the battery attachment surface. Doing so may reduce the magnitude of the magnetic field that holds the battery pack to the EV, making it easier for the automated systems of the battery swapping station to remove the battery pack, or perhaps even releasing the battery pack altogether.

The second mode could alternatively involve orienting the magnets of the Halbach array such that the strong side of the magnetic field is still located on a battery-facing side of the battery attachment surface, but is in the opposite direction, such that the battery pack is repelled from the battery attachment surface. Such an implementation may be particularly useful in an arrangement where the swapping station components that receive a battery from the EV are not configured to pull the battery away from the vehicle (e.g., as might be the case in the arrangement described in reference to FIG. 4 below). More specifically, if reversing the strong and weak side of the Halbach array does not fully release the battery pack, and the battery swapping station component does not include a mechanism for pulling the battery away from the EV, then it may be beneficial to implement a second mode where the Halbach array actually pushes the battery pack away from the EV.

In other embodiments, a switchable magnet 106 could be implemented with one or more electromagnets, which could be turned on and off to hold the battery pack in place. In order for such electromagnets to function when the battery pack has been removed from the EV, such electromagnets may be powered by one or more secondary power sources.

Figure 2:
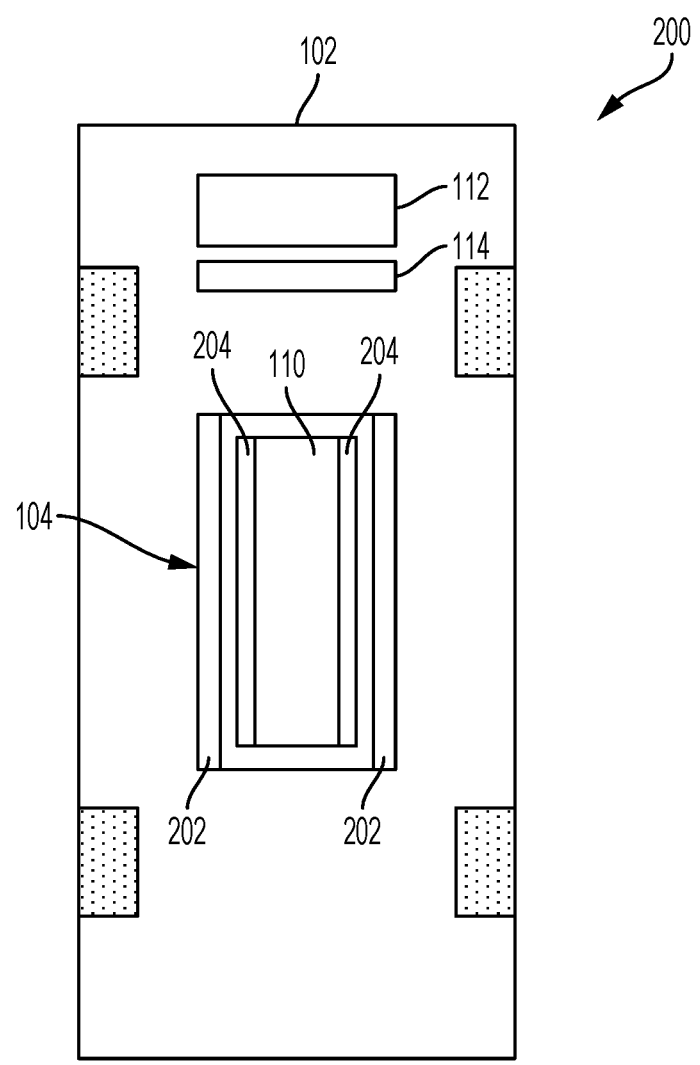
FIG. 2 is an illustration of a battery-changing system according to an example embodiment.

FIG. 2 illustrates one embodiment of a battery-changing system 200 which includes an EV 102 with a recess 104, where a first pair of switchable magnets 202 are located on the longitudinal surfaces of the recess 104. The outer casing of the battery pack 110 is manufactured from ferromagnetic materials such that the magnetic forces of the first pair of switchable magnets 202 secure the battery pack 110 within the confines of the recess 104. Both switchable magnets 202 can be simultaneously turned off to release the battery pack 110 from the recess 104.

In some embodiments, a second pair of switchable magnets 204 are longitudinally attached to the battery pack 110. In this embodiment, the recess 104 does not include any switchable magnets, and is constructed in a metallic material such that the magnetic forces from the second pair of switchable magnets 204, when turned on, secure the battery pack 110 to the recess 104.

In some embodiments, both the first 202 and second switchable magnets 204 are incorporated into the recess 104 and battery pack 110, respectively. In this embodiment, the first 202 and second switchable magnets 204 will be manipulated such that the magnetic forces of the two switchable magnets will secure the battery pack 110 in the recess 104, In some embodiments, the EV 102 includes a reserve power source 112, such as a 12V battery or other source of electricity such that the EV 102 can power its critical components or passenger comfort components (A/C, radio etc.) when the battery pack 110 is detached from the recess 104. The reserve power source allows for a "hot swapping" of the battery pack 110.

In a further embodiment, EV 102 may include a reserve internal combustion motor ("ICM") 114 that turns on during hot swapping. The ICM can be used only during hot swapping or can be used to provide additional power during cruising. In another embodiment, the the ICM 114 can further be used to charge the battery pack 110 to extend the range of the EV 102.

In other embodiments, the recess 104 may be eliminated from the structure of the EV 102. The switchable magnet 106 may be located on the outer surface of the bottom of the EV 102. in such an embodiment, the battery pack 110 may include additional structural reinforcements in its outer casing to protect the battery components from the elements.

Figure 3:
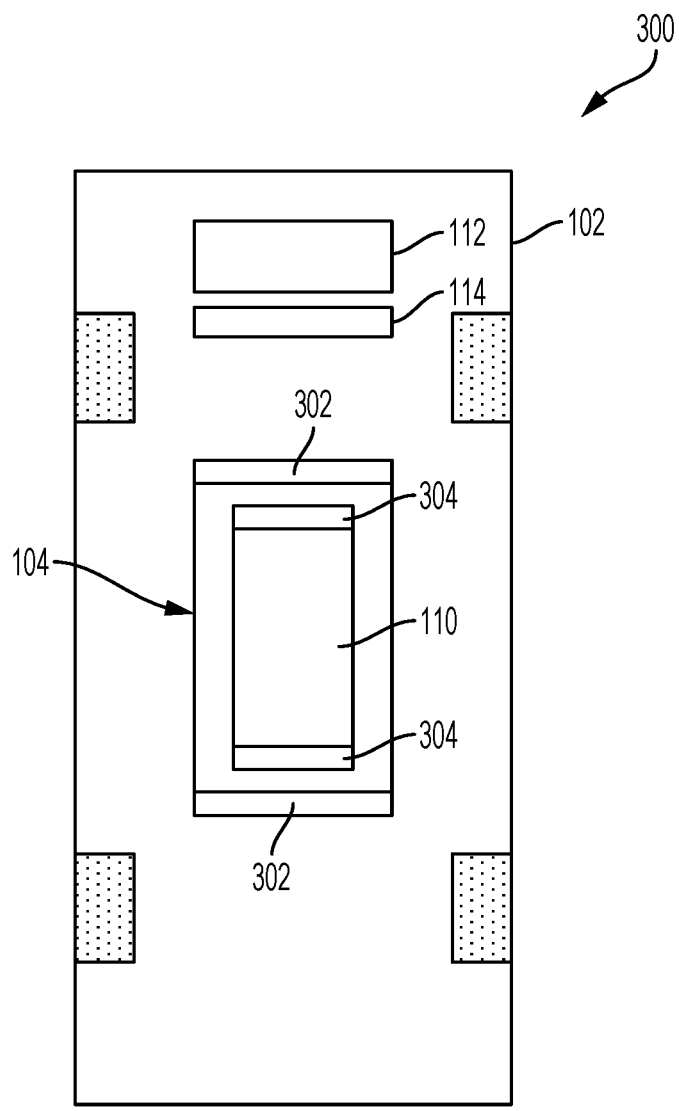
FIG. 3 is another illustration of a battery-changing system according to an example embodiment, with a battery pack and an alternate location of the magnetic elements.
Figure 4:
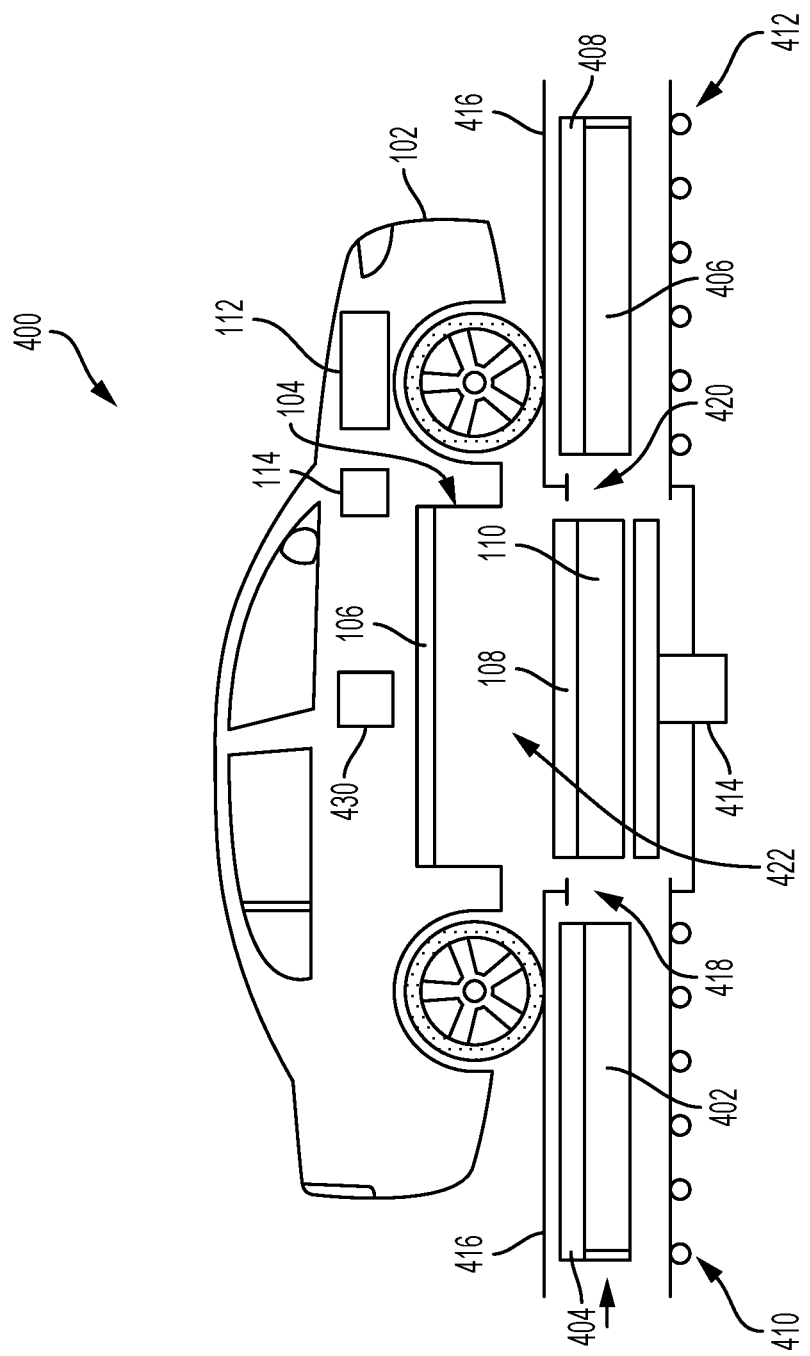
FIG. 4 is an illustration of one embodiment showing a battery swapping station.

FIG. 3 illustrates another embodiment of a battery-changing system 300 which includes an EV 102 with a recess 104, where a first pair of switchable magnets 302 is located on the transverse surfaces of the recess 104. The outer casing of the battery pack 110 is manufactured from ferromagnetic materials such that the magnetic forces of the first pair of switchable magnets 302 secure the battery pack 110 within the confines of the recess 104. Both switchable magnets 202 can be simultaneously turned off to release the battery pack 110 from the recess 104.

In some embodiments, a second pair of switchable magnets 304 are longitudinally attached to the battery pack 110. In this embodiment, the recess 104 does not include any switchable magnets, and is constructed in a metallic material such that the magnetic forces from the second pair of switchable magnets 304, when turned on, secure the battery pack 110 to the recess 104.

In a further aspect of some embodiments, both the first 302 and second switchable magnets 304 are incorporated into the recess 104 and battery pack 110, respectively. In this embodiment, the first 302 and second switchable magnets 304 can be manipulated such that the magnetic forces of the two switchable magnets will secure the battery pack 110 in the recess 104, Referring now to FIG. 4, an illustrative battery swapping station 400 includes a platform 416 that includes a bay 422 where the battery packs 110, 402, 406 can be raised up and down to the recess 104 of the EV 102. The bay 422 has two openings 418, 420 opposite each other where the battery packs 402, 406 enter and exit the bay 422. The battery packs 110, 402, 406 are raised up and down via a piston mechanism 414 that has a flat top section where the battery pack 110 is placed. The flat section includes a multi-directional conveyer belt system such that it can slide and transport battery packs 110 in multiple directions. Underneath the platform 416, are conveyer belts 410, 412 that transport battery packs 402, 406 to and away from the bay 422.

In a further aspect, battery swapping station 400 includes a control system 430. The control system may take the form of and/or may include various types computing devices, communication interfaces, various interfaces to sensors, and/or interfaces to various user-input devices, among other possibilities. Generally, a control system will at least include a processor, executable program instructions stored on a non-transitory computer readable medium, and communication interfaces that allow for communications to be sent to and/or received from various components of the battery swapping station 400, and/or communication interfaces that allow for communications to be sent to and/or received from various components of EV 102, such that functions described herein may be carried out at the battery swapping station 400. For example, control system 120 may include program instructions that are executable by a processor to: (i) at a time when the one or more switchable magnetic systems are operating in a first state in which a magnetic field of the one or more switchable magnetic systems secures the first battery pack to the battery attachment surface, position the battery support component to support the first battery pack that is secured to the battery attachment surface of the electric vehicle, (ii) while the battery support component is positioned to support the first battery pack, receive a message corresponding to removal of the first battery pack, and (iii) in response to the message, operate the battery support component to: (a) remove the first battery pack from the electric vehicle, (b) receive a second battery pack, and (c) position the second battery pack against or near to the battery attachment surface of the electric vehicle so as to facilitate the one or more switchable magnetic systems switching back to operation in the first mode to magnetically secure the second battery pack to the battery attachment surface of the electric vehicle.

In some embodiments, the battery swapping station 400 includes a transport system that transports battery packs 402, 406 to and from the bay 422 to a battery storage area in the battery swapping station 400. The transport system may be a multi-wheeled platform that automatically drives itself to set locations underneath the platform 416.

In some embodiments, the EV 102 does not include a recess 104. Instead, the switchable magnet is attached to the outer surface of the bottom of the EV 102. In such a configuration, the battery swapping station 400 does not include a piston mechanism. Instead, battery pack 110 is transported into the bay 422 via the conveyer belt 410, 412 and the magnetic force of the switchable magnet 106 pulls the battery pack 110 to the bottom of the EV 102. Alternatively, the battery pack 110 may have its own switchable magnet 108 such that the magnetic forces pulling the battery pack 110 to the bottom of the EV from both switchable magnets 106, 108 is sufficient.

In a further aspect, a mechanism for properly aligning the EV 102 with the bay 422 may include various types of sensor systems (not shown) to detect the presence, location, and/or position of the EV 102 within the battery-changing station 400. For example, a battery-changing station may include cameras, proximity sensors, LIDAR systems, and/or other systems that can detect when an EV 102 has arrived at the battery-changing station 400 and how the car is positioned. In particular, such sensor systems may be operable to determine how the car is positioned with respect to the bay 422, such that a control system for the bay 422 can determine the movements of the piston mechanism 414 that are required to remove a battery 110 from the EV 102 and/or to place a battery 110 in the EV 102.

Figure 5:
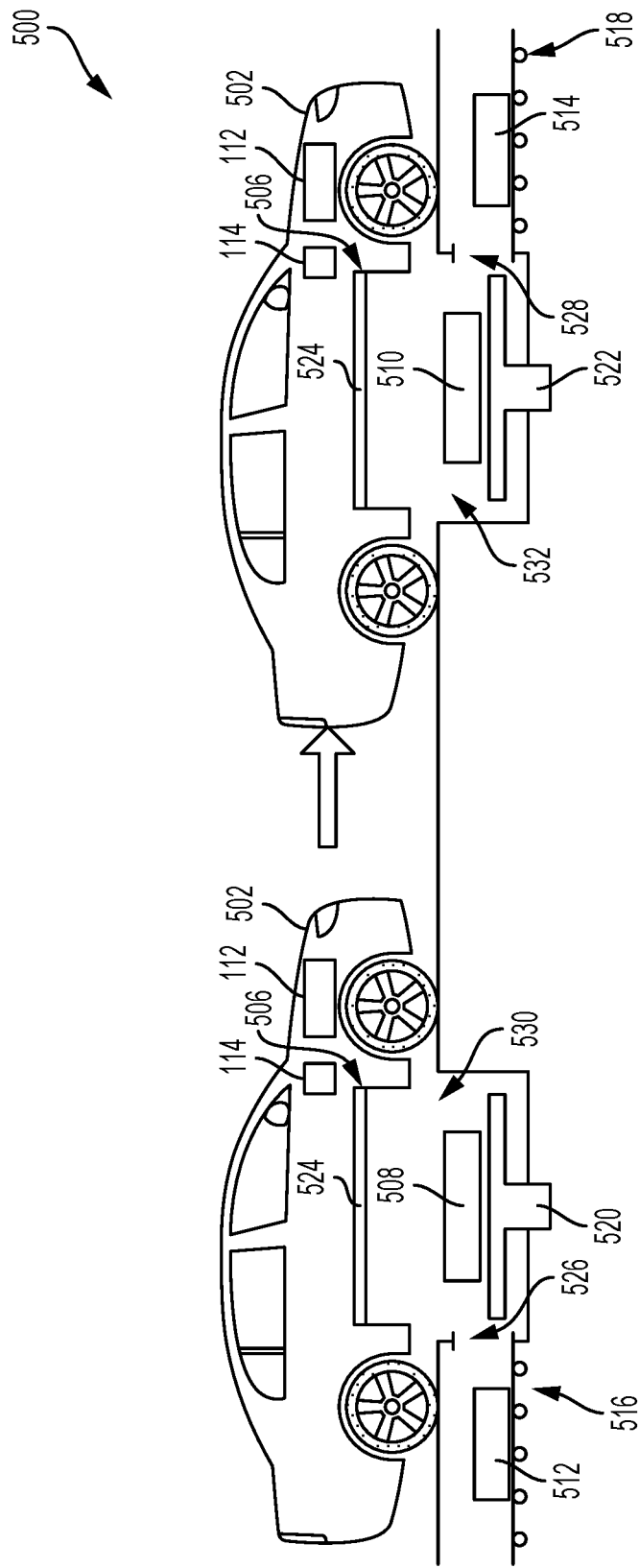
FIG. 5 is an illustration of an example battery swap scenario.

Referring now to FIG. 5, an example battery swapping scenario is shown. The battery swapping station 500 has two separate bays 530, 532. The first bay 530 is used to remove the old battery pack 508 from the EV 502 and the second bay 532 is used to attach the new battery pack 510 to the EV 502. The EV 502's switchable magnet 524 can be located inside a recess 506 or located on the outer surface on the bottom of the EV 502. To one side of the first bay 530 is a first opening 526 where the old battery pack 508 enters and is put on a conveyor belt system 516 so that the old battery pack 508 can be transported to a battery storage facility in or near by the battery swapping station 500. The second bay 532 also includes a second opening 528 on one side where a new battery pack 510 is transported from a battery pack storage facility before it is ready to attach with an EV 502. The new battery pack 510 can be transported to the second bay 532 via a conveyor belt 518 or other transport mechanism that can support the weight and size of the new battery pack 510.

In some embodiments, the battery swapping station 500 is equipped with a rail setup such that the EV 502 is guided from the first bay 530 to the second bay 532 to properly align the EV 502 with the first and second bay 530 532. The rail system could resemble mechanisms that can be found in common automated car wash centers where the wheel on one side of the vehicle is guided via a rail.

In some embodiments, while the battery is being swapped, the EV 102 will continue to be powered using a reserve power source 112. This allows common passenger convenience features such as A/C or necessary electronics, such as radio, to be operational while the battery pack 110 is being swapped.

Figure 6:
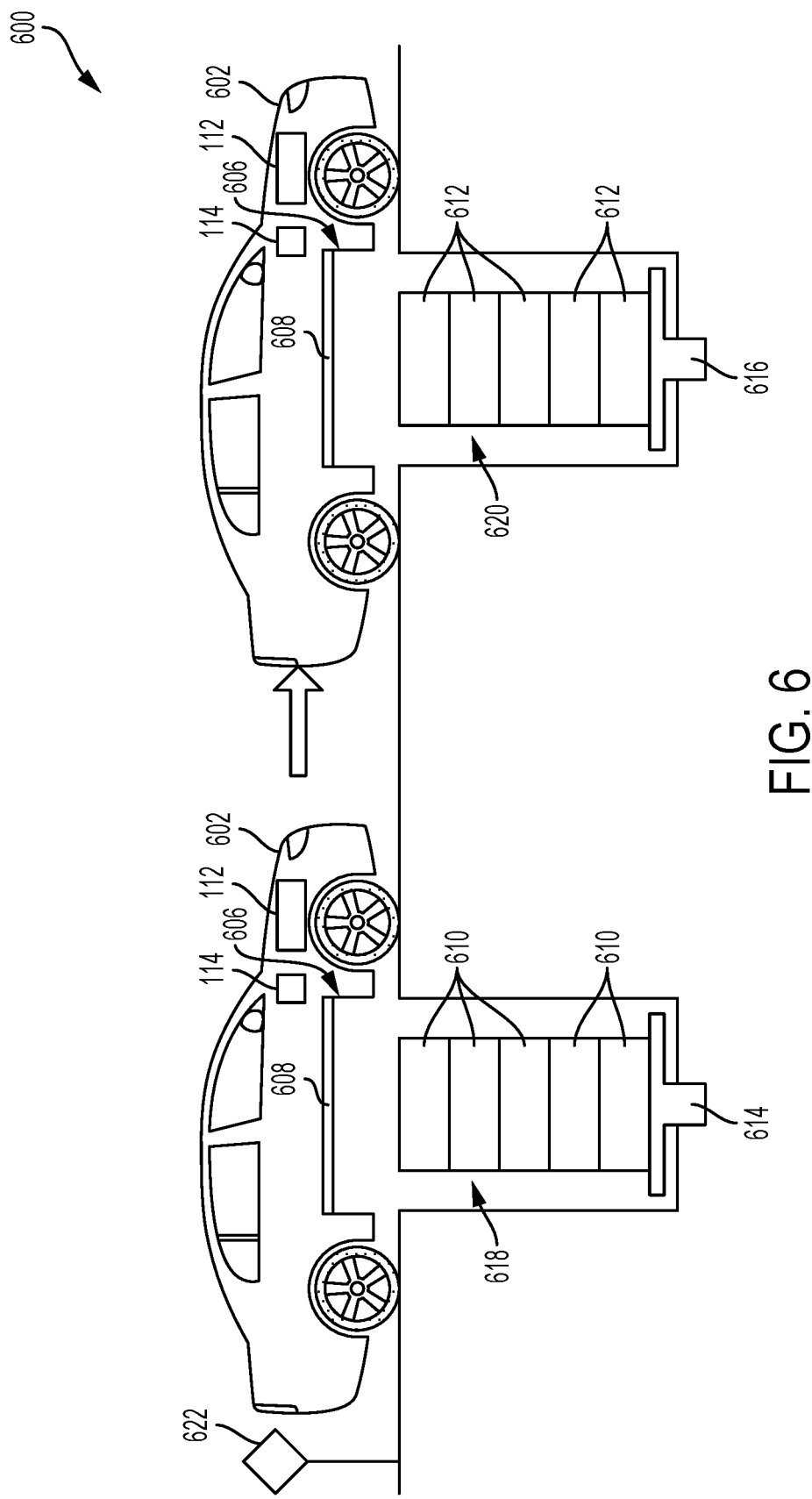
FIG. 6 is an illustration of another example battery swap scenario.

FIG. 6 illustrates another battery swapping scenario, according to an example. In the scenario shown in FIG. 6, the battery changing system does not include a conveyor system. Instead, the system shown in FIG. 6 includes a first by 618 for removing a used battery from an EV, and a second bay 620 for inserting a charged battery into the EV. In this illustrated embodiment, the first bay 618 and second bay 620 both have a piston mechanism 614, 616 that lower and raise battery packs 610, 612. The bays 618 and 620 can each handle a limited number of battery packs 610 612 depending on the depth of the bay 618 and 620. The first bay 618 may include space to stack old battery packs 610 as they are detached from EVs. Further, the second bay 620 may include space for new battery packs 612, which may be stacked on the piston mechanism 616. As each new battery pack is attached to incoming EVs 602, the piston mechanism 616 can raise the remaining stack of new battery packs 612 until all the new battery packs 612 are depleted. If the first bay 618 reaches capacity or the second bay 620 is depleted of new battery packs 612 a pop-up sign 622 or a signal, such as an LED light, is illuminated to let the EV 602 drivers know that the battery swapping service cannot be provided at a particular bay(s).

In some embodiments, while the battery is being swapped, a reserve power source 112 may provide power to the EV. This allows common passenger convenience features such as A/C or necessary electronics, such as radio, to be operational while the battery pack 110 is being swapped. Additionally or alternatively, an external power source located at the charging station may be attached to the EV during the battery changing process, so as to provide power while the battery pack is being replaced. It is also possible that the EV may simply be without power during the battery changing process.

In some embodiments, the battery swapping station 600 is equipped with a rail system such that the EV 602 is guided from the first bay 618 to the second bay 620 to properly align the EV 502 with the first and second bay 620. The rail system could resemble mechanisms that can be found in common automated car wash centers where the wheel on one side of the vehicle is guided via a rail. Other types of rail systems are also possible.

III. Illustrative Methods

FIG. 7 is a flowchart illustrating a method 700 according to an example embodiment. The one or more switchable magnetic systems of the EV is initially operated in a first state, where the magnetic field of the one or more switchable magnetic systems magnetically secures a first battery pack to the battery attachment surface of the EV 702. The first battery pack is generally an old battery pack that is drained of its power. In preparation for the swapping of the first battery pack, the EV's position is detected to determine that it is in an acceptable alignment with the battery support component 704. Once proper alignment between the EV and the battery support component has been determined 706, one or more of the switching magnet systems is switched from the first state of operation to a second state of operation 708, such that the first battery pack is removed from the battery attachment surface 710. In preparation for attaching a second battery pack, which generally is a fully charged battery pack, the second battery pack's position is detected such that it is positioned against or near to the battery attachment surface 712. Once the second battery pack's position is determined to be against or near to the battery attachment surface 714, one or more of the switchable magnetic systems is switched back into the first mode such that the magnetic field of the one or more switchable magnetic systems secures the second battery pack to the battery attachment surface 716.

In another embodiment, the one or more switchable magnetic systems is a switchable Halbach array. A first state of the switchable Halbach array positions the plurality of magnets of the Halbach array such that the magnetic field of the Halbach array is concentrated on a first side of the battery facing surface and secures the first battery pack to the battery facing surface.

The second state of the switchable Halbach array positions the plurality of magnets of the Halbach array such that there is no magnetic field on the first side of the battery facing surface, or that the magnitude of the magnetic field on the first side of a battery facing surface is reduced significantly compared to the first state.

When the one or more switchable Halbach arrays are in the second state, such that the strength of the magnetic field is reduced on the first side of the battery facing surface compared to the first state, the battery pack is released from the battery attachment surface.

In another embodiment, when the one or more switchable Halbach arrays are in the second state the strength of the magnetic field securing the battery pack to the battery facing surface is reduced compared to that of the first state.

IV. Configuration of Swapping Station with Robotic Arm

FIG. 8 is an illustration of another battery-changing system according to an example embodiment, which includes a robotic arm. The robotic arm 800 may be operable could to remove a battery from an EV 802 and/or to provide a new battery to the EV 802.

More specifically, EV 802 may include a battery compartment 804 (e.g., a recess) that is designed to fit a battery 806 for the EV. Further, at least one switchable magnet 807, such as a switchable Halbach array, may be arranged to hold battery 806 in battery compartment 804, such that the battery 806 is electrically coupled and can provide power for the EV's electrical systems and components. In particular, the battery 806 may include or be formed from one or more magnetic materials. The magnetic materials of battery 806 are arranged on or in the magnet such that when the switchable magnet 807 is turned on (e.g., when a Halbach array's magnetic field is directed towards the interior of the battery compartment 804), the battery is held in the battery compartment 804 by the magnetic field of the switchable magnet 807.

Robotic arm 800 includes an end effector 808, which may take the form of or include a switchable magnet. Thus, for ease of explanation, end effector 808 may be referred to interchangeably as a switchable magnet or a switchable magnetic end effector. Robotic arm 800 is configured to translate along and rotate about three axes, and thus is moveable with six degrees of freedom. It should be understood, however, that various shapes, sizes, and types of robotic arms may be utilized, which may include one, two, or more joints, and which may allow for various degrees of freedom in movement.

In a further aspect, a battery-changing station with a robotic arm 800 may include various types of sensor systems (not shown) to detect the presence, location, and/or position of the EV within the battery-changing station. For example, a battery-changing station may include cameras, proximity sensors, LIDAR systems, and/or other systems that can detect when an EV has arrived at the battery-changing station and how the car is positioned. In particular, such sensor systems may be operable to determine how the car is positioned with respect to the robotic arm 800, such that a control system for the robotic arm 800 can determine the movements of the robotic arm that are required to remove an old battery from the EV and/or to place a new battery in the EV. Alternatively, movement of the robotic arm during the process of changing a battery may be partially or wholly manual (e.g., controlled by a human operator).

When EV 802 pulls into a battery-changing station that includes robotic arm 800, a control system may move the robotic arm so as to position switchable magnetic end effector 808 adjacent to battery 806. The switchable magnet on end effector 808 may then be turned "on" (e.g., by directing the switchable magnet's magnetic field towards battery 806), such that end effector 808 magnetically attaches to the battery 806. Once the battery 806 is secured by the end effector 808, EV 802 (or more specifically, a control system thereof) may turn "off" switchable magnet 807 to release the battery 806 from the EV. The robotic arm 800 may then remove the battery 806 from the EV 802 and place battery 806 in an appropriate location (e.g., a used battery storage location, or perhaps directly in a battery charger).

After removing battery 806, the robotic arm 800 may place a new and fully-charged battery in EV 802. More specifically, robotic arm 800 may position end effector 808 over a battery 810 stored at a charged battery storage location 812. (Note that multiple new batteries may be stored in charged battery storage location 812.) The switchable magnet on end effector 808 may then be turned "on" so that end effector 808 magnetically attaches to a new battery 810. The robotic arm may then move so as to position the new battery 810 in EV's battery compartment 804. At this point, EV 802 may turn "on" switchable magnet 807 to magnetically secure the new battery 10 within the battery compartment 804. The robotic arm 800 may then turn "off" the switchable magnet on end effector 808 to release the new battery 810 from the end effector. The robotic arm 800 may then withdraw the end effector from the EV 802, such that EV 102 can leave the battery-changing station.

In a further aspect, a battery-changing station with a robotic arm 800 may also include one or more wired or wireless communication systems for communicating with EV 102 and/or for other types of communication. For example, a control system may include a WiFi, cellular, or Bluetooth communication system for communicating with the EV's onboard computing systems. The ability to communicate with the EV's onboard computing systems may assist in the battery-changing process in various ways. For example, the EV may provide feedback to help the robotic arm 800 align the magnetic end effector 808 with the battery compartment, may indicate what type of battery should be used for the EV (if multiple types of batteries are available at the station), and/or may provide other information to assist in the battery-changing process. Additionally or alternatively, the control system for the battery-changing station may indicate to the EV when the EV should turn "off" the switchable magnet 807 to release battery 806, and/or when the EV should turn "on" the switchable magnet 807 to secure a new battery 810 in the battery compartment 804. Other examples of communications between the battery-changing station and the EV are also possible.

V. Illustrative Switchable Halbach Arrays

As noted above, switchable Halbach arrays may be used in an EV and/or in a battery swapping station. Generally, a Halbach array may achieve an amplified magnetic field on one side of the array while almost completely cancelling the magnetic field on the other side (or "one-sided flux"), by arranging a number of magnetic rods so as to have a spatially rotating pattern of magnetisation. For instance, an array of discrete magnetic rods can be arranged to approximate a spatially rotating pattern by placing the magnetic rods parallel to one another and rotating each of the rods such that each subsequent rod in the array has polarization direction is rotated by 90 degrees from the polarization direction of the previous rod in the array. For example, if a first rod is polarized towards 0 degrees, the second rod will be arranged with its polarization at 90 degrees, the the third rod will be arranged with its polarization at 180 degrees, the fourth rod will be arranged with its polarization at 270 degrees, and so on.

Figure 9A:
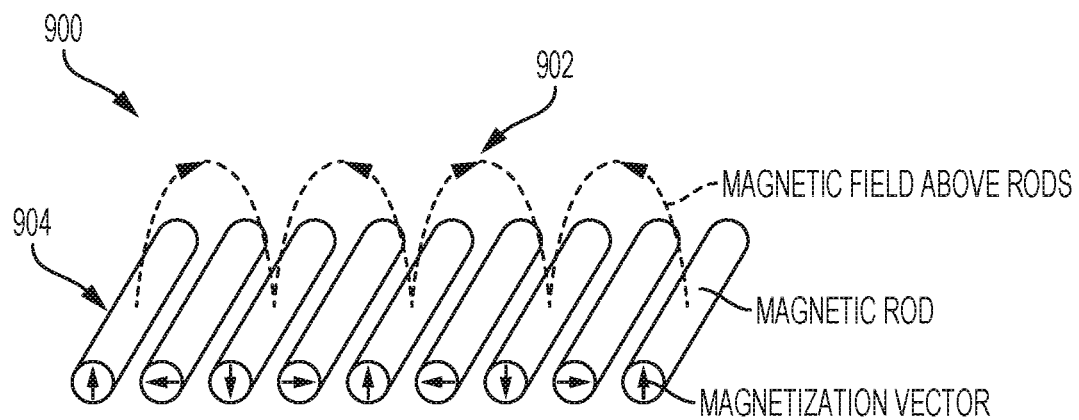
FIGS. 9A and 9B are illustrations of magnetic rod arrangement in a Halbach array.
Figure 9B:
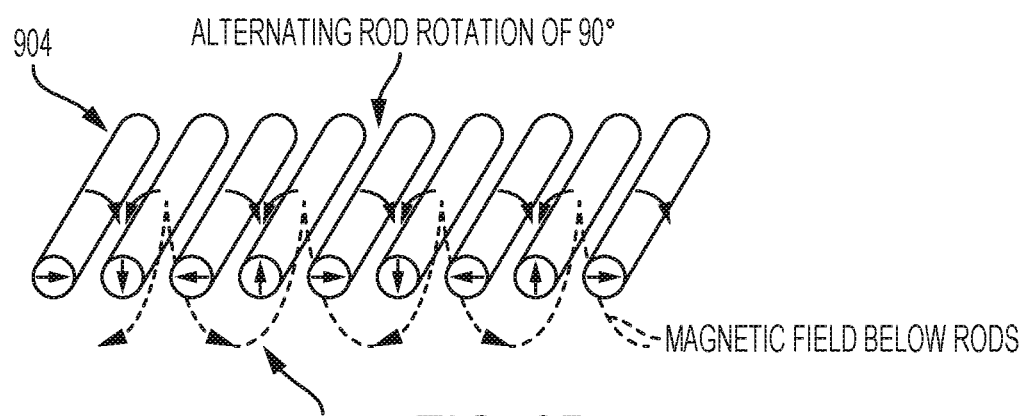

FIG. 9A shows an arrangement of magnetic rods in Halbach array 900. To switch between a first and second mode and reverse the strong and weak side of the magnetic field 902 of the Halbach array 900, some or all of the magnets in the array may be rotated. For instance, FIG. 9B shows how the magnetic rods 904 from the Halbach array shown in FIG. 9A may be rotated to reverse the magnetic field 906 of the Halbach array. More specifically, in FIG. 9B, each magnet is rotated 90 degrees in alternating directions.

Thus, to be made switchable, a Halbach array may include a mechanism for mechanically rotating some or all of the magnets in the array, so as to reverse the magnetic field 902 (e.g., so that the magnetic field is canceled out or made substantially weaker on the side where it was previously concentrated, and vice versa). For example, FIGS. 10A and 10B are illustrations a switchable Halbach array 1000, according to an example embodiment.

As shown, the switchable Halbach array 1000 includes a rack and pinion system for re-orienting the magnets in the switchable Halbach array 1000. More specifically, the rack and pinion system includes a notched slider 1002 that engages its teeth in cylindrical housings 1004 that hold magnetic rods 1006 that make up the switchable Halbach array 1000. A rack and pinion is a type of linear actuator that comprises a pair of gears which convert rotational motion into linear motion. A circular gear called "the pinion" (in the present invention the cylindrical housing 1004) engages teeth on a linear "gear" bar called "the rack" (in the present invention the notched slider 1002); rotational motion applied to the pinion causes the rack to move relative to the pinion, thereby translating the rotational motion of the pinion into linear motion. The array housing 1008 holds the notched slider 1002 and cylindrical magnetic-rod housings 1004 in place, such that sliding the slider 1002 to a specific location between two positions flips the magnetic field back and forth.

Figure 10A:
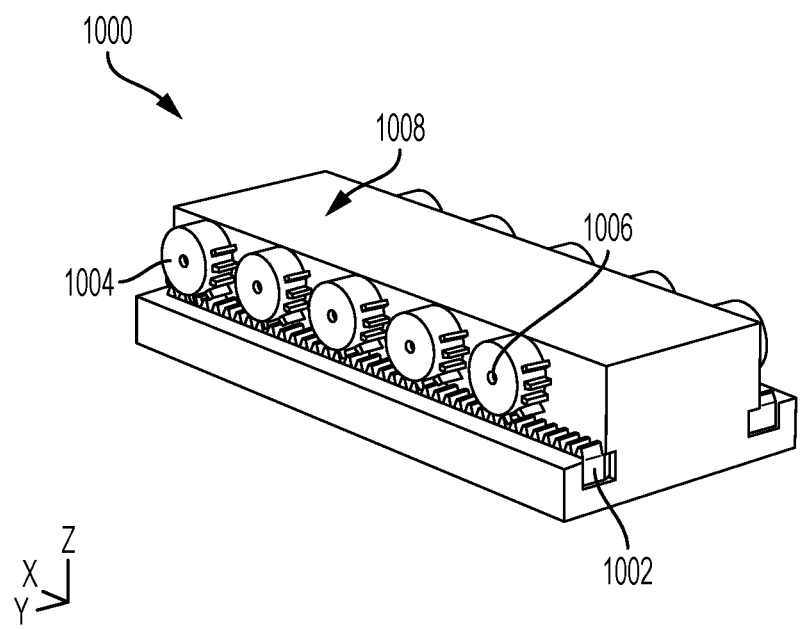
FIGS. 10A and 10B are illustrations of an exemplary switchable Halbach array.
Figure 10B:
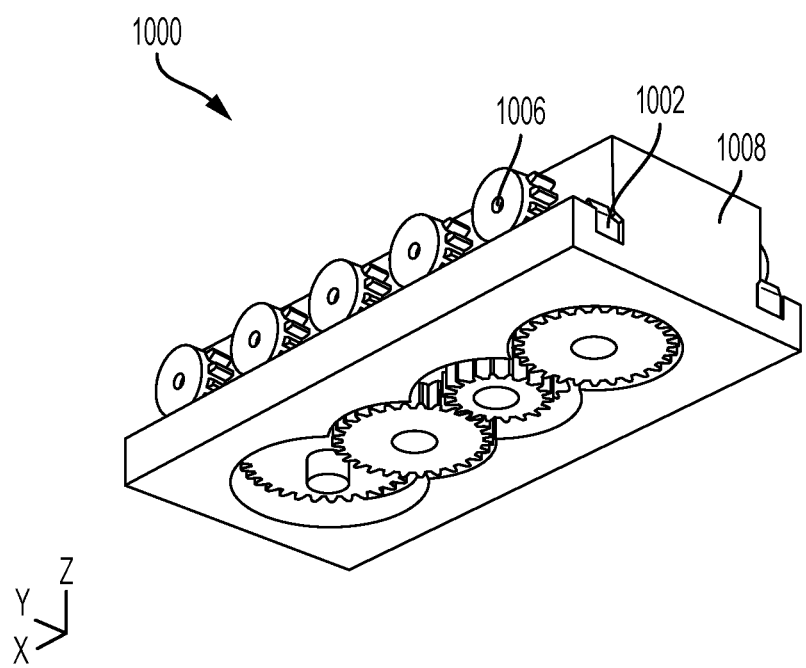

Specifically the switchable Halbach array 1000 illustrated in FIGS. 10A and 10B is encased in an array housing 1008 and includes five cylindrical diametrically-polarized NIB magnets 1006. Each magnet 1006 has a geared cylindrical housing 1004 attached to its end, which mates with one of two notched sliders 1002 running along either side of the housing 1008. Each slider 1002 is, in turn, moved by a second set of teeth engaged with a central gear (not shown), which is the final gear in a four-gear train providing about a 12:1 ratio. The input of the gear train would generally be driven by a small electric motor. The rack and pinion mechanism can be replaced with a cascaded worm gear design, where the racks are replaced with worms which are turned by gears driven by a worm on the motor shaft. This would provide a much higher gear ratio in a similar space.

Further, it should be understood that the examples of switchable Halbach arrays described in reference to FIGS. 9A, 9B, 10A, and 10B are not intended to be limiting. Other types of switchable Halbach arrays may be utilized in example embodiments, without departing from the scope of the invention.

VI. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

A computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system, comprising:
one or more switchable magnetic systems located at or near a battery attachment surface of an electric motorized device, wherein the battery attachment surface is arranged to accept and electrically connect a battery pack; and
a control system operable to:
operate the one or more switchable magnetic systems in a first state in which a magnetic field of the one or more switchable magnetic systems magnetically secures the battery pack to the battery attachment surface, such that the battery pack is electrically coupled to an electric system of the electric motorized device, wherein the electric system includes an electric motor;
receive a message corresponding to removal of the battery pack from the electric motorized device; and responsively switch the one or more switchable magnetic systems to operate in a second state in which the magnetic field of the one or more switchable magnetic systems has a reduced magnitude, wherein the reduced magnitude of the magnetic field is sufficient to magnetically secure the battery pack to the battery attachment surface, wherein the battery pack is removed from the battery attachment surface by pulling the battery pack to overcome the magnetic field having the reduced magnitude.

2. The system of claim 1, wherein the one or more switchable magnetic systems comprise one or more switchable Halbach arrays.

3. The system of claim 2, wherein the one or more switchable Halbach arrays are mechanically switchable between the first state and the second state.

4. The system of claim 1, further comprising the battery pack.

5. The system of claim 4, wherein the battery pack further comprises one or more second switchable Halbach arrays.

6. The system of claim 1, further comprising a reserve power source that is operable to provide power to secondary electrical components of the electric motorized device when the battery pack is decoupled from the electric motorized device.

7. The system of claim 1, wherein the battery attachment surface is located in a recess of an outer surface of the electric motorized device, wherein the recess is configured to accept the battery pack therein.

8. The system of claim 1, further comprising one or more additional switchable magnetic systems configured to apply an additional magnetic field to pull the battery pack from the battery attachment surface when the one or more switchable magnetic systems operate in the second state.

9. The system of claim 8, wherein the one or more additional switchable magnetic systems are an end effector of a robotic arm.

10. A battery changing system comprising:
a battery support component that is positionable against a first battery pack that is magnetically secured to a battery attachment surface of an electric motorized device by one or more first switchable magnetic systems of the electric motorized device; and
a control system that is operable to:
at a time when the one or more first switchable magnetic systems are operating in a first state in which a magnetic field of the one or more first switchable magnetic systems secures the first battery pack to the battery attachment surface, position the battery support component to support the first battery pack that is secured to the battery attachment surface of the electric motorized device;
while the battery support component is positioned to support the first battery pack, receive a message corresponding to removal of the first battery pack; and
in response to the message, operate the battery support component to: (a) remove the first battery pack from the electric motorized device, (b) receive a second battery pack, and (c) position the second battery pack against or near to the battery attachment surface of the electric motorized device so as to facilitate the one or more first switchable magnetic systems switching back to operation in the first state to magnetically secure the second battery pack to the battery attachment surface of the electric motorized device, wherein the first battery pack from the electric motorized device is removed by operating one or more second switchable magnetic systems to create a magnetic field that cancels the magnetic field of the first battery pack such that the first battery pack is released from the battery attachment surface of the electric motorized device.

11. The battery changing system of claim 10, wherein the one or more switchable magnetic systems of the electric motorized device comprise one or more switchable Halbach arrays located on the outer surface of the bottom of the electric motorized device.

12. The battery changing system of claim 11, further comprising at least one bay that is alignable with the battery attachment surface of the electric motorized device, wherein the battery support component is arranged in the at least one bay and comprises:
a battery support surface configured to support at least one battery pack; and
a piston mechanism operable to raise and lower the battery support surface, so as to position the battery support surface to remove the first battery pack from the electric motorized device, receive the second battery pack, and position the position the second battery pack against or near to the battery attachment surface for magnetic attachment to the battery attachment surface.

13. The battery changing system of claim 12, further comprising a rail guide system to direct movement of the electric motorized device between a first bay and a second bay, wherein the first bay is configured for removal of the first battery pack, and wherein the second bay is configured for positioning of the second battery pack against or near to the battery attachment surface of the electric motorized device.

14. The battery changing system of claim 10, further comprising a conveyor belt system that is operable to transport the first battery pack from the battery support component to a used-battery storage area.

15. The battery changing system of claim 10, further comprising a conveyor belt system that is operable to transport the second battery pack from a charged-battery storage area to the battery support component.

16. The battery charging system of claim 10, further comprising a robotic arm, wherein the battery support component comprises an end effector attached to the robotic arm, and wherein the end effector comprises one or more second switchable magnetic systems that are operable to secure a battery pack to the end effector.

* * * * *